United States Patent [19]
Dickey et al.

[11] Patent Number: 5,481,276
[45] Date of Patent: Jan. 2, 1996

[54] DEVICE INDEPENDENT INTERFACE FOR GRAPHICS DISPLAY DEVICES

[75] Inventors: Conwell J. Dickey; James M. King, both of Ft. Collins, Colo.

[73] Assignee: Hewlett-Packard Company, Palo Alto, Calif.

[21] Appl. No.: 342,401

[22] Filed: Nov. 18, 1994

Related U.S. Application Data

[63] Continuation of Ser. No. 830,155, Feb. 3, 1992, abandoned.
[51] Int. Cl.$^6$ ........................................ G09G 5/00
[52] U.S. Cl. ............................... 345/132; 345/3
[58] Field of Search ................... 345/1, 3, 127, 345/132, 189, 204, 119

[56] References Cited

U.S. PATENT DOCUMENTS

| | | | |
|---|---|---|---|
| 4,439,762 | 3/1984 | Van Vliet et al. | 345/132 |
| 4,845,644 | 7/1989 | Anthias et al. | 345/119 |
| 4,862,156 | 8/1989 | Westberg | 345/133 |
| 4,990,902 | 2/1991 | Zenda | 345/132 |
| 5,276,458 | 1/1994 | Sawdon | 345/132 |

FOREIGN PATENT DOCUMENTS

0442676A2  8/1991  European Pat. Off. .

OTHER PUBLICATIONS

Winn L. Rosch, "Hardware Bible", 1992, pp. 502–503.

*Primary Examiner*—Ulysses Weldon
*Assistant Examiner*—Matthew Luu

[57] ABSTRACT

A device independent system and method of displaying text on a graphics display device. The system provides programmed routines in a storage device located on a controller card for the graphics device. These routines are loaded into memory by an operating system during initialization of the operating system. Once loaded, the routines become an extension of the operating system to provide the means for displaying information on the graphics device. Each type of graphics device contains a storage device that provides a set of access routines specifically programmed for the device. These routines have a standard interface across all devices, allowing displaying of textual information to be device independent. The storage device contains multiple sets of routines, one for each processor type capable of utilizing the graphics device, thus processor independence is achieved.

15 Claims, 11 Drawing Sheets

DEVICE INDEPENDENT INTERFACE FOR GRAPHICS DISPLAY DEVICES

CROSS REFERENCE TO RELATED APPLICATION

This is a continuation of application Ser. No. 07/830,155, filed on Feb. 3, 1992, now abandoned.

FIELD OF THE INVENTION

This invention relates to computer systems and more particularly to graphics output devices within such computer systems. Even more particularly, the invention relates to sending information to a graphics output device for display.

BACKGROUND OF THE INVENTION

When an operating system is first loaded into a computer, it typically performs a few housekeeping tasks and then displays information on the computer's display device to tell the user of the computer system about the various stages of initialization being performed. However, before the operating system can display information on the display device it must know how to access the display device. Some computer systems, for example the IBM Personal Computer, have registers containing bits that define the particular type of display installed on the computer system. Because the operating system can read this register before any display of data is necessary, the operating system can determine the type of display. Once the operating system knows the display type, programming code already existing within the operating system can display information on the device.

This type of system has limitations, however, since only a limited number of display devices can be defined in a particular register. More importantly, before a new display type can be installed on such a system, the operating system must have been rewritten to provide programming code capable of using the new display type. Also, the shipment of the display type cannot occur until the new release of the operating system, capable of using the display type, is shipped and installed.

As more and more new types of display devices are introduced for new computer systems, this problem becomes more severe. If an operating system does not have a register, as described above, to define the type of display available, the operating system must use some other mechanism to determine which type of display is installed on the particular computer system or assume that one particular type is installed. This may also require that the operating system be capable of addressing all possible types of display devices that could be installed on the computer system, and if a new display type becomes available, it cannot be used on any computer system until the operating system has been modified to utilize it.

Another significant aspect of this problem occurs after the operating system has been modified to utilize the new display type. If the new version of the operating system expects to use the new display type as a console device, the new version cannot be installed until the new display is installed. Since the old version of the operating system cannot use the new display, both the new version of the operating system and the new display must be installed at the same time. This makes error detection very difficult, since it is very difficult to determine the location of a problem. That is, if nothing is displayed, is the display or the new version of the operating system at fault?

This problem is even more severe where the manufacturer of the display device is different from the manufacturer of the operating system. In this instance, considerable coordination between different companies must be established and maintained in order to utilize new hardware.

There is need in the art then for a common method of accessing any display device in order to display information on the display device. There is further need in the art for this method to be identical regardless of the type of display device. A still further need in the art is for such a method to be common for different types of processors. The present invention satisfies these and other needs in the art.

SUMMARY OF THE INVENTION

It is an aspect of the present invention to provide a system for sending information to a graphics device for display.

It is another aspect of the present invention to provide a system for sending textual information to a graphics device for display.

Another aspect of the invention to provide such a system that is independent of the particular graphics display device type.

Yet another aspect is to provide a system than allows such display independent of the characteristics of the graphics display device.

Still another aspect is to provide a standard method for expanded capabilities in new devices while maintaining compatibility with existing devices.

A further aspect is to provide a system that allows multiple processor types to access the graphics device.

The above and other aspects of the invention are accomplished in a system that defines a method of displaying text on a graphics device. The system is independent of the particular graphics device and may be utilized for multiple types of processors.

The system provides a set of routines, all having a standard interface. The set of routines is provided in a read only memory (ROM) device, or other storage device, located on a controller card for the graphics display device. Each graphics device installed on the computer system provides, within the ROM contained on its particular controller card, the set of access routines specifically programmed for the particular device. When an operating system starts execution, it copies the routines from the ROM on the controller card into the random access memory (RAM) utilized by the operating system. Once this code is in RAM it becomes an extension of the operating system to provide the set of programming routines for use in displaying information on the graphics display. Since the access routines are installed along with the graphics device, and the interface to these routines is standard across multiple devices, accessing of the graphics display device is device independent.

The set of routines includes an initialization routine, a self test routine, a font unpack and move routine for displaying characters, a block move routine for moving information within the display memory, an interrupt processing routine, and a configuration inquiry routine to allow other parts of the operating system or application programs to determine the characteristics of the graphics display device. The self test and the initialize graphics device routines are used by the operating system to place the graphics device into a known state. Once this has been accomplished, the unpack move routine can be used to unpack characters of a font contained in the ROM and place the characters into a form suitable for display on the graphics device. The characters can be displayed directly by the font unpack and move routine, or the characters can be moved within the display memory area by the block move routine once they have been processed by the font unpack and move routine.

Although the ROM contains at least one font suitable for use with the device, the font unpack and move routine is capable of using other fonts supplied either by the operating system or by user application programs running within the operating system.

To provide usability across multiple processor types, more than one set of access routines are contained within the ROM on the graphics device controller card. Thus, a set of routines may be provided for each processor type into which the graphics device can be installed. In this manner, access to the graphics device is provided in a standard way across multiple processor types having different instruction sets.

BRIEF DESCRIPTION OF THE DRAWINGS.

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
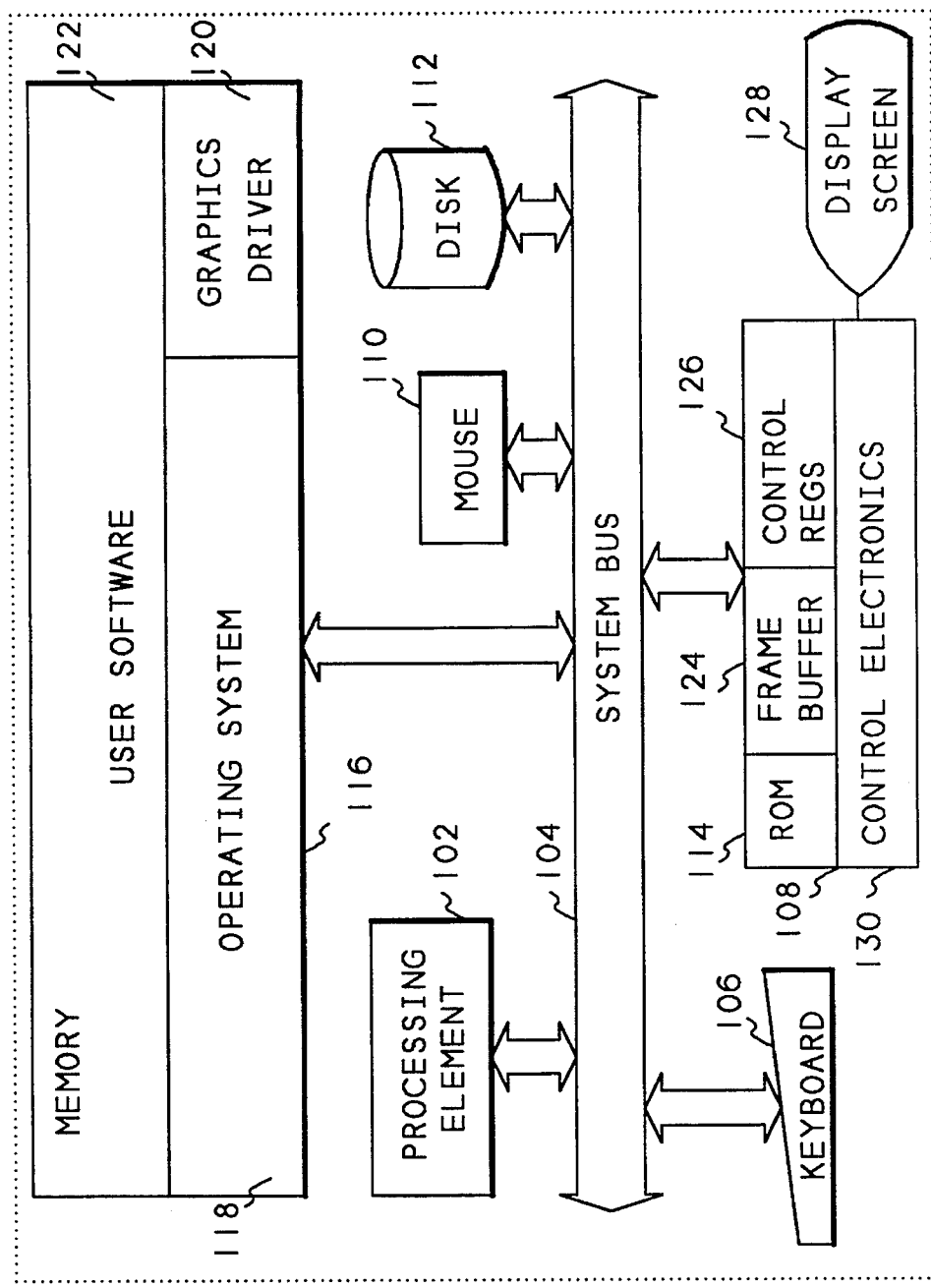
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The present invention is accomplished by placing data and programming code into a read only memory (ROM) which is installed on a controller card for a graphics device. The contents of the ROM will be loaded into the computer system by the initialization routine of an operating system. When the operating system starts processing, its initialization routine scans for any graphics devices presently installed in the computer system, and when one is found it loads the contents of the ROM from the graphics device controller card into RAM to be used by the operating system.

The ROM contents include device data such as an identification of the particular graphics device and at least one font for use in displaying characters as well as pointers to functions within the ROM. These functions include an initialization routine to put the graphic system into an initialized state capable of supporting text output to the device. It performs such operations as enabling the needed frame buffer planes, setting up the color map and returning configuration information that varies from one type of graphics device another. A state management routine provides the capability to save the current state of the graphics device before it is initialized and then restore this state at a later time to allow interleaved use of the graphics device by several tasks in a multi-tasking environment. A font unpack and move routine unpacks a font character out of the font storage area and places it at a location within the frame buffer to allow it to be displayed on the graphics screen or to allow it to be used later for display. A block move routine moves a variable sized block of data from one x,y pixel location in the frame buffer to another. This routine can be used to move data within the frame buffer, to clear a data block within the frame buffer, and to move font characters after they have been unpacked by the font unpack and move routine described above. A self test routine tests the device at power up to insure that it is operating correctly. An inquire configuration routine will return the current configuration of the graphics device to allow the operating system and application programs to fully utilize the graphics device.

In addition to providing programming code to perform the routines described above, the ROM provides at least two sets of programming code for at least two different types of processors. Thus the system provides not only a device independent means for displaying text on the graphics device, it also provides a device independent means for multiple processor types, allowing the graphics device to be installed in multiple types of computer systems.

FIG. 1 shows a block diagram of a computer system incorporating the present invention. Referring now to FIG. 1, a computer system 100 contains a processing element 102. The processing element 102 communicates to other elements of the computer system 100 over a system bus 104. A keyboard 106 allows a user of the computer system to input information into the computer system 100 and a graphics display 108 allows the computer system to output information to the user. A mouse 110 is used to input graphical information and a disk 112 is used to store data and programs within the computer system 100. A memory 116, also attached to the system bus 104, contains an operating system 118 and a graphics driver module 120. The memory 116 also holds the user software 122.

A ROM 114 contains the data and program code of the present invention. As will be described below, when the system performs its initialization routines, it copies the contents of the ROM 114 into the graphics driver module 120 where the routines are performed. Although a read only memory (ROM) is used in the preferred embodiment of the invention, any storage device could be used to contain the data and programmed routines of the invention. Also, although the ROM contents are loaded into memory before use in the preferred embodiment, in other embodiments the routines could be used while still present in the ROM.

A frame buffer 124 contains the data being displayed on the display screen 128. Control registers 126 define how the control electronics 130 accesses information from the frame buffer 124 and sends this information to the display screen 128.

Table 1 shows example contents for the ROM 114 of the present invention. In the preferred embodiment the ROM is organized to be addressable as a 32 bit word, however, only one byte of the word is actually used as part of the ROM. This provides considerable savings since only a single, byte-wide, read only memory device needs to be used to store the data. Since the ROM is byte-wide and the routines are four bytes wide, the routines must be unpacked to combine each successive four bytes from the ROM into a four-byte word before the routines can be executed. In other embodiments, a four byte-wide ROM could be used.

Offset location 0x0003 contains a one byte device type which is used to distinguish graphic devices from other devices which might be installed in the computer system 100. Offset 0x0007, the next sequential byte of the ROM, is unused and offset locations 0x000b and 0x000f contain revision numbers to distinguish the different release levels of the ROM. Offset locations 0x0013 through 0x002f contains an eight byte graphics ID, which is a number unique to the particular type of graphics device installed. Offset locations 0x0033 through 0x003f contain the starting address of a font contained in the ROM 114. Although the ROM always contains a font for use by the device, as will be described below, the font unpack move routine can also utilize other fonts supplied within the memory system 116. Offset locations 0x0043 through 0x004f contain the maximum number of words necessary to save the state of the graphics device. This allows the operating system 116 to determine how much space is needed by the state management routine, described below. Offset locations 0x0053 through 0x005f contain the address of the last byte in the ROM and is used to allow the self test routine to perform a cyclic redundancy check to determine if the ROM contents have been altered. Location 0x0063 through 0x006f contain a pointer to a device region list, which contains information describing how the graphics display device is to be mapped within the memory space of the computer system 100. The region list contains a series of 32 bit words each of which defines various areas within the graphics device space or within spaces of multiple graphics devices contained in the same input/output slot. Region zero, the first entry in the list, must define the location of the ROM 114; region one, the second entry in the list, defines the location of the graphics device frame buffer used to display information; and region two, the third entry in the list, must define the graphics device control register locations. The last entry in the region list is defined to be a pointer which would point to a second region list used for future expansion. All data structures used within the present invention contain a pointer to a future data structure as their last entry. This allows the invention to be used with future devices which might require more information than devices presently known.

Offset locations 0x0073 and 0x0077 contain the number of words needed to temporarily store values and allow reentry of the routines described below. Offset locations 0x007b and 0x007f contain a number which is the maximum number of tenths of seconds a routine may take to execute. If a routine takes longer than this time it is considered to be nonfunctional and processing of the routine will be discontinued. Locations 0x0083 through 0x00ff within the ROM 114 are not used. In the preferred embodiment, all unused locations are set to zero.

Offset locations 0x0103 through 0x017f contain the address of the various routines of the present invention. These addresses, however, are of routines programmed for a particular processor, in this case a RISC processor. Offset locations 0x0203 through 0x027f provide a comparable list of addresses of routines programmed for a different processor, a Motorola 68000. Additional routines for additional processors could be defined within the ROM 114, for example at locations 0x0303 through 0x037f, 0x0403 through 0x047f, etc. The number of sets of routines for different processors defined is limited only by the size of the ROM 114.

Calling conventions for passing data into and out of each of the routines is standard across multiple graphics device types and multiple processors. Each call to one of the routines passes four pointers to data structures. The first of these structures is a flag data structure which contains all the flags that may be passed into or out of the routine. In addition, the flag data structure contains a future pointer, as its last entry, which allows additional flags to be passed in future versions of the ROM while maintaining compatibility with current versions. The second of the four structures is the input data which contains all parameters passed into the routine. This structure also contains a future pointer as its last entry. The third data structure is the output data structure which contains pointers to all data which will be returned from the routine. Also, this structure has a future pointer as its last entry. The fourth structure is a pointer to the configuration data defining the graphics device. This structure is typically built by the INIT_GRAPH routine, described below, and this structure also contains a future pointer to allow for expanded configuration information on future device types.

The future pointer, described above with respect to each of the routines, provides flexibility for possible future expansion for each structure. If additional parameters need to be added to any routine in the future, this pointer would be used to point to an additional structure containing the new parameters. When unused, the pointer is null to indicate that it is unused. For example, if a new graphics device is developed which requires additional features to be passed to the INIT_GRAPH routine, this device's INIT_GRAPH routine would then use the future pointer to access this new data. When called by an old version of the operating system, the INIT_GRAPH routine would be passed a null value for the future pointer, and INIT_GRAPH would not utilize the additional capabilities, to insure that this new device will have predictable results with the older version of the operating system. This capability allows the development of new hardware and the development of new operating system versions to be decoupled. If an additional structure is added via the future pointer, the new structure must also have a future pointer as its last entry to provide for additional future expansion.

Figure 2:
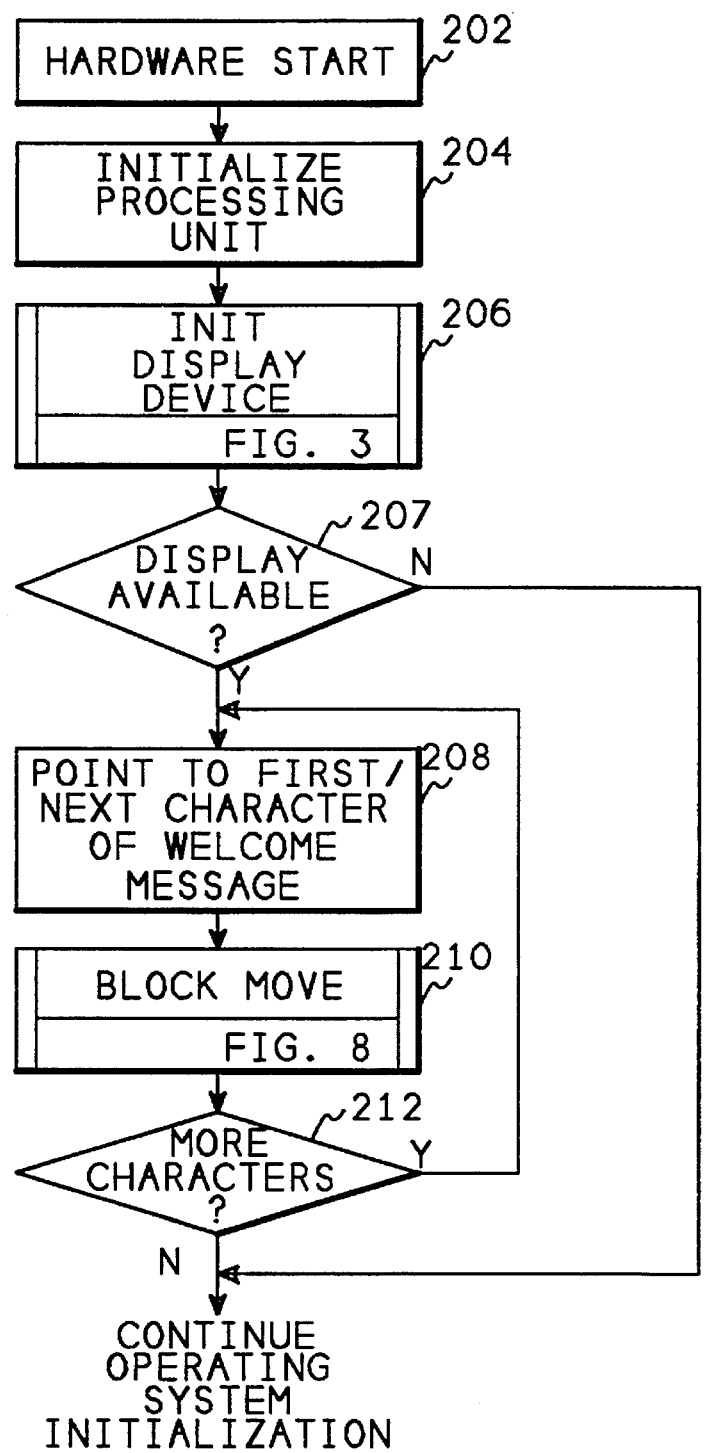
FIG. 2 shows a flowchart of an operating system startup routine that uses the present invention.

FIG. 2 shows a flowchart of an operating system initialization routine that uses the present invention. Referring now to FIG. 2, when a hardware initialization or power on sequence occurs, control is transferred to a particular location in memory which contains code, typically in a read only memory, to perform initialization and to load the initial portions of an operating system from a disk. Block 202 represents transfer to this hardware ROM. Block 202 transfers to block 204 of the ROM where the processing unit is initialized. Block 206 then calls FIG. 3 to initialize the display device using the methods of the present invention. After the display device has been initialized, block 206 transfers to block 207 which determines whether the graphics display was available and successfully passed its self-test routine. If no display device is available, displaying of text is bypassed, and initialization continues with the other portions of the operating system. If the device is available and it passed self-test, block 207 transfers to block 208 which points to the first or next character of a welcome message to be displayed to the user of the operating system. Block 208 then transfers to block 210 which calls FIG. 8 to display the character pointed to by block 208. After this character is displayed, block 212 determines whether additional characters need to be displayed in the message and if so transfers back to block 208 to point to the next character in the message. After the entire message has been displayed, block 212 transfers to other portions of the operating system to continue its initialization. During these other portions of the initialization of the operating system, and later when application programs are loaded and running, the routines of the present invention may be called by the operating system or application programs to display additional text on the graphics device.

Figure 3:
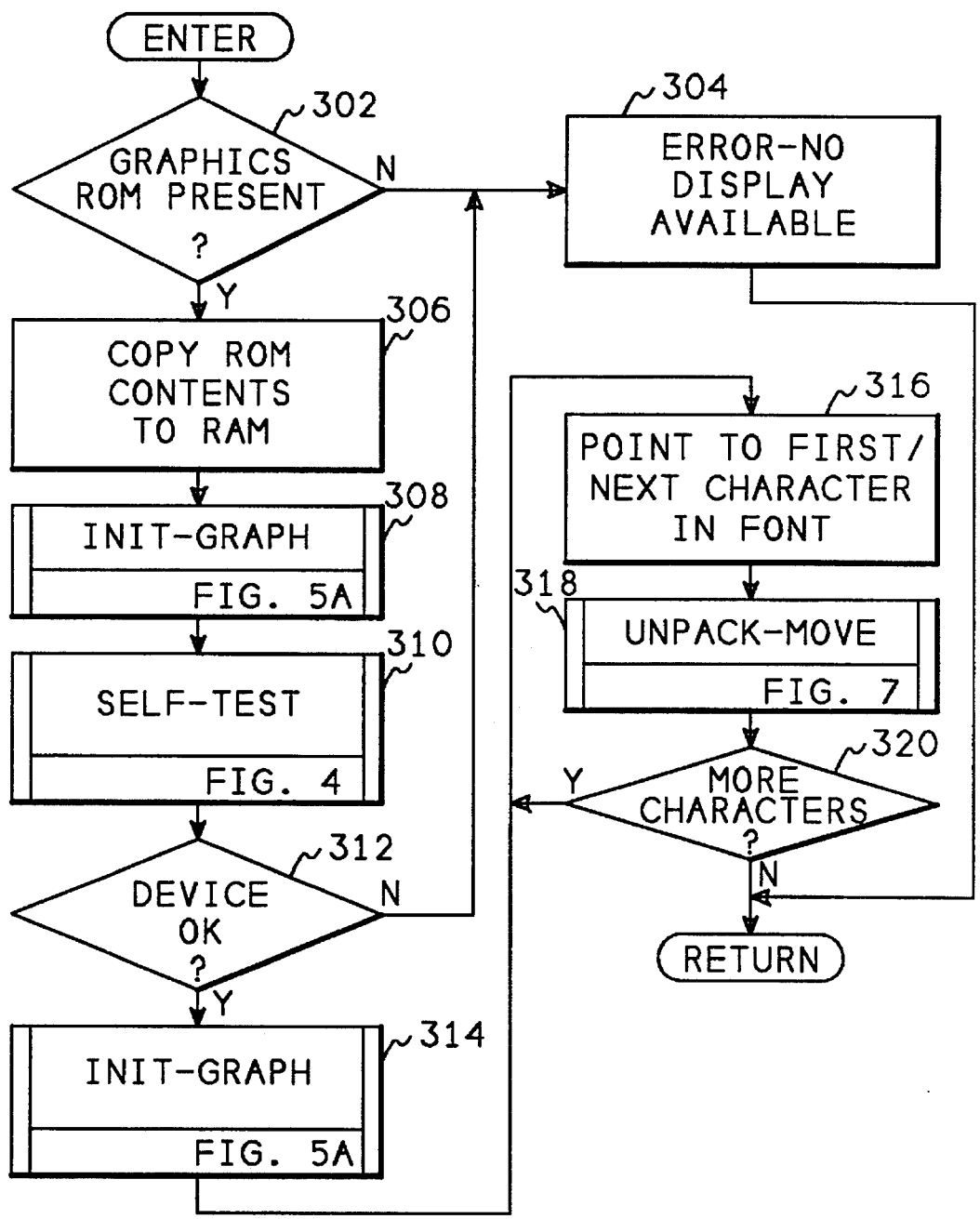
FIG. 3 shows a flowchart of the initialize routine of the operating system.

FIG. 3 shows a flowchart of the initialization routine called from FIG. 2. Referring now to FIG. 3, after entry, block 302 determines whether a graphics device, including a ROM, is present. This determination is done by accessing various locations on the system bus 104 (FIG. 1) where graphics devices may be installed to determine if the device type byte located at offset 0x0003 (see Table 1) is present. If a correct value is read from the location containing the device type, then the ROM must be present and block 302 would transfer to block 306. If a ROM is not detected, block 302 transfers to block 304 and returns an error code to FIG. 2 indicating that no display is available.

If a graphics display is available, block 302 transfers to block 306 which copies the contents of the ROM 114 (FIG. 1) into the memory 116 (FIG. 1) as part of the graphics driver 120 (FIG. 1). Once the ROM contents have been copied into RAM, block 306 transfers to block 308 which calls the INIT_GRAPH routine of FIG. 5A to initialize the graphics display device. Once the device is initialized, block 308 transfers to block 310 which calls the SELF_TEST routine of FIG. 4 to determine whether the device is operational. If the device is not operational, block 312 transfers to block 304 which returns an error indicating that no display is available. If the device is operational, block 312 transfers to block 314 which calls the INIT_GRAPH routine of FIG. 5A a second time to restore the state of the device since performing the self test may alter the device state.

After the device is initialized, the operating system may unpack the font contained in the ROM and store it into unused locations within the frame buffer of the graphics device. The font can be used directly from the ROM, or it can be copied to RAM and used from Ram to improve performance. Typically, a graphics device can display a certain number of bits on its screen, however, the memory used to store these bits may be larger than the number of bits displayed. When the memory is larger, the excess memory is often used to store font characters in a displayable format, which allows these font characters to be moved directly to the displayable portion of the screen when they are needed, improving performance.

In the example of FIG. 3 the font is unpacked and moved into an unused area of the frame buffer 124 (FIG. 1). Block 316 points to the first or next character in the font, as defined by Tables 1 and 2. Block 318 then calls FIG. 7 to unpack and move this character into an unused area of the frame buffer 124. Block 320 then determines if there are more characters need to be unpacked and if there are, block 320 transfers back to block 316 to unpack the next character. After all characters have been unpacked, block 320 returns to FIG. 2.

Figure 4:
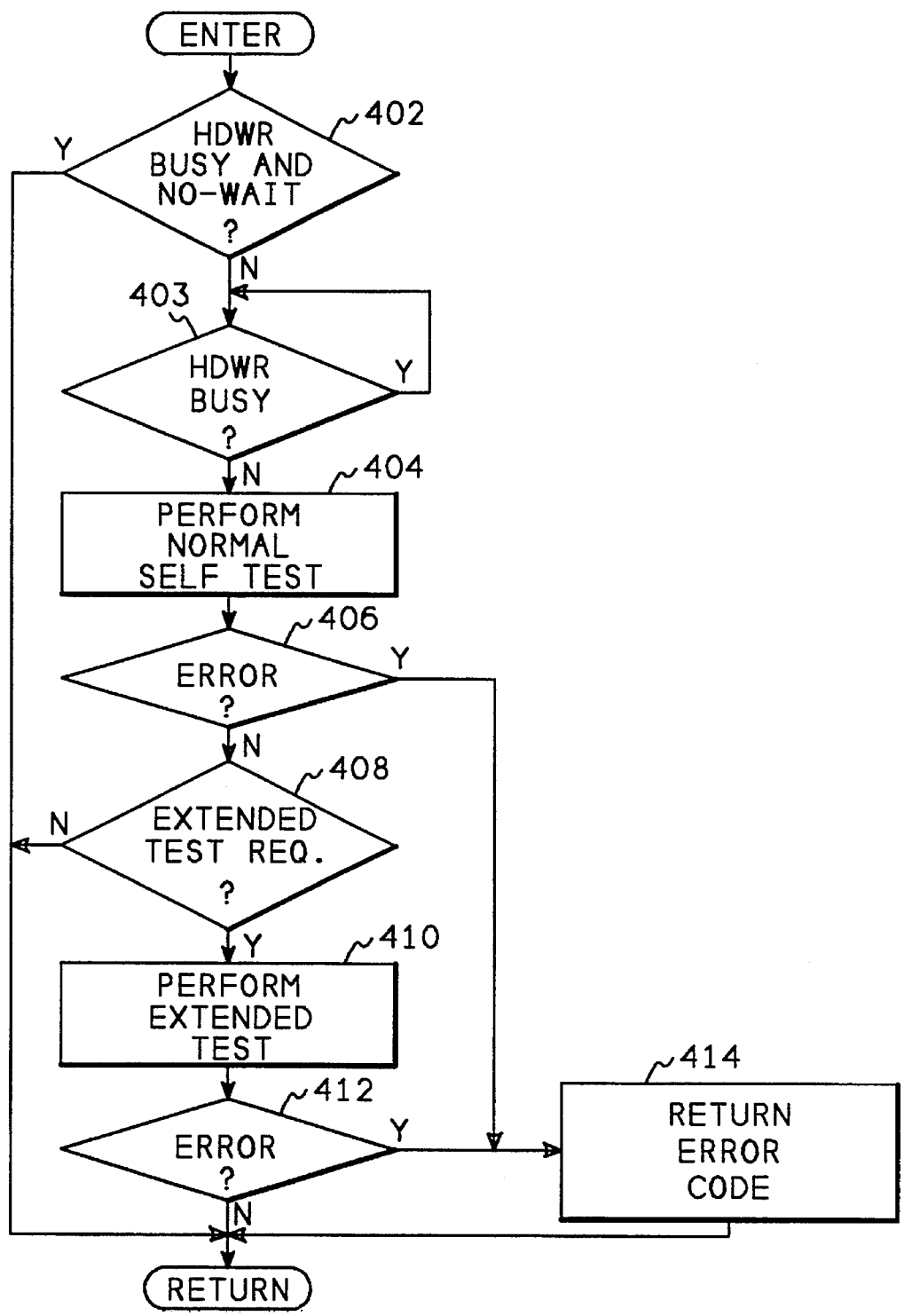
FIG. 4 shows a flowchart of the self test routine of the invention.

FIG. 4 shows a flowchart of the SELF_TEST routine of the present invention. Referring now to FIG. 4, after entry, block 402 determines whether the hardware of the graphics device is busy and whether a flag was passed to the SELF_TEST routine indicating that the routine should not wait. If the hardware is busy and the flag indicates that the routine should not wait, block 402 simply returns to its caller. The caller can re-enter the SELF_TEST routine later, as the caller desires. If the caller sets the flag bit indicating that this routine should not wait, it will be the caller's responsibility to again call this routine at a future time.

If the flag indicated that this routine should wait, block 402 transfers to block 403 which determines whether the hardware is busy. If the hardware is busy, block 403 simply loops on itself until the hardware is free. After the hardware is free, block 403 transfers to block 404 which performs a normal self test. This type of test is dependent on the particular graphics device, and will change from one device type to another. After the normal self test is performed, block 406 determines whether an error occurred and if an error did occur, block 406 transfers to block 414 which returns an error code. Error codes may be device independent or device dependent. If no error occurred, block 406 transfers to block 408 which determines whether a flag was passed indicating that an extended test should be performed. If no extended test is to be performed, block 408 returns to the caller. If an extended test was requested, block 408 transfers to block 410 which performs the extended test and then transfers to block 408 to determine whether an error occurred. If an error did occur, block 412 transfers to block 414 which returns an error code to the caller. If no error occurred, block 412 returns directly to the caller.

Figure 5A:
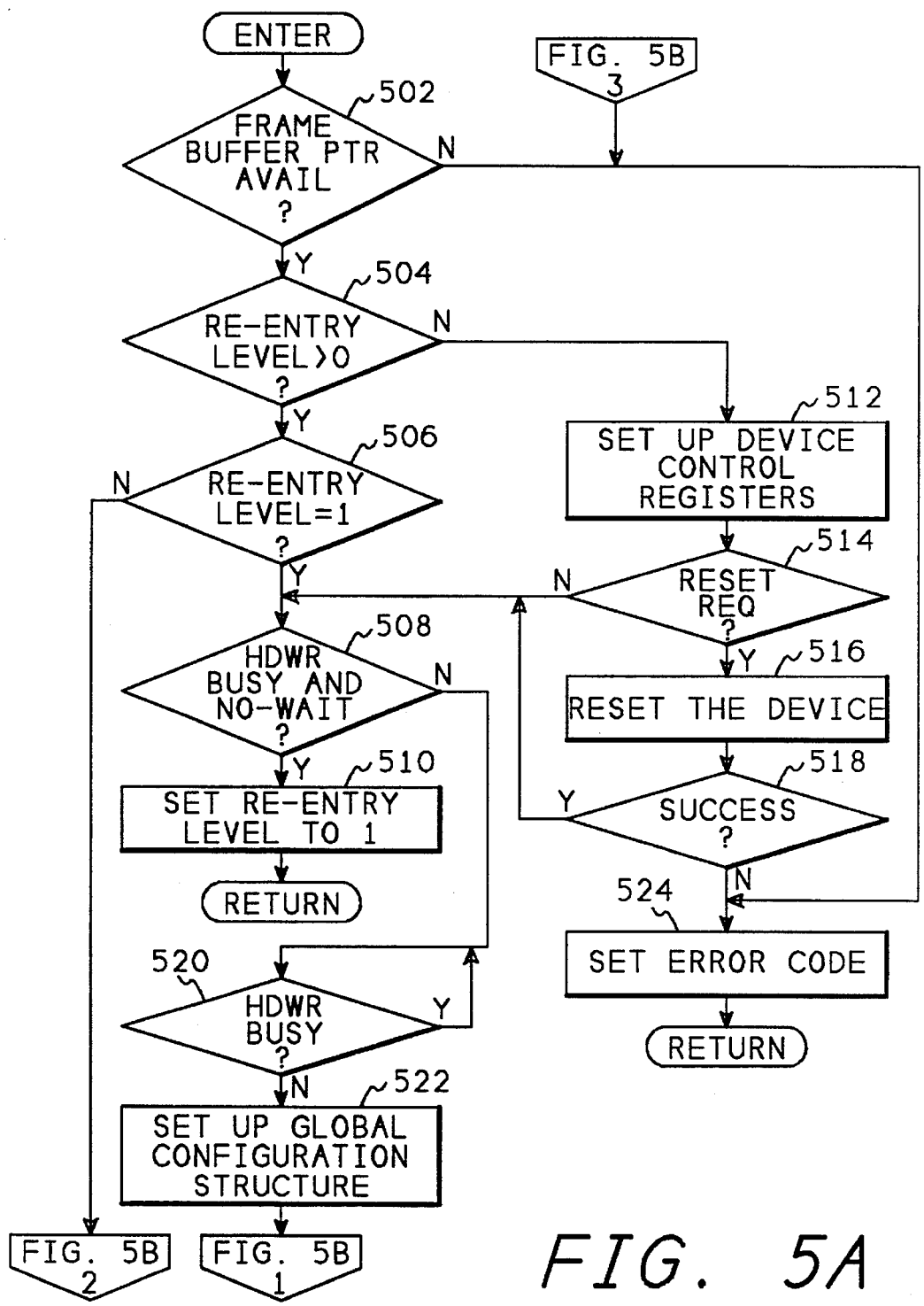
FIGS. 5A and 5B show a flowchart of the initialize graphics device routine.
Figure 5B:
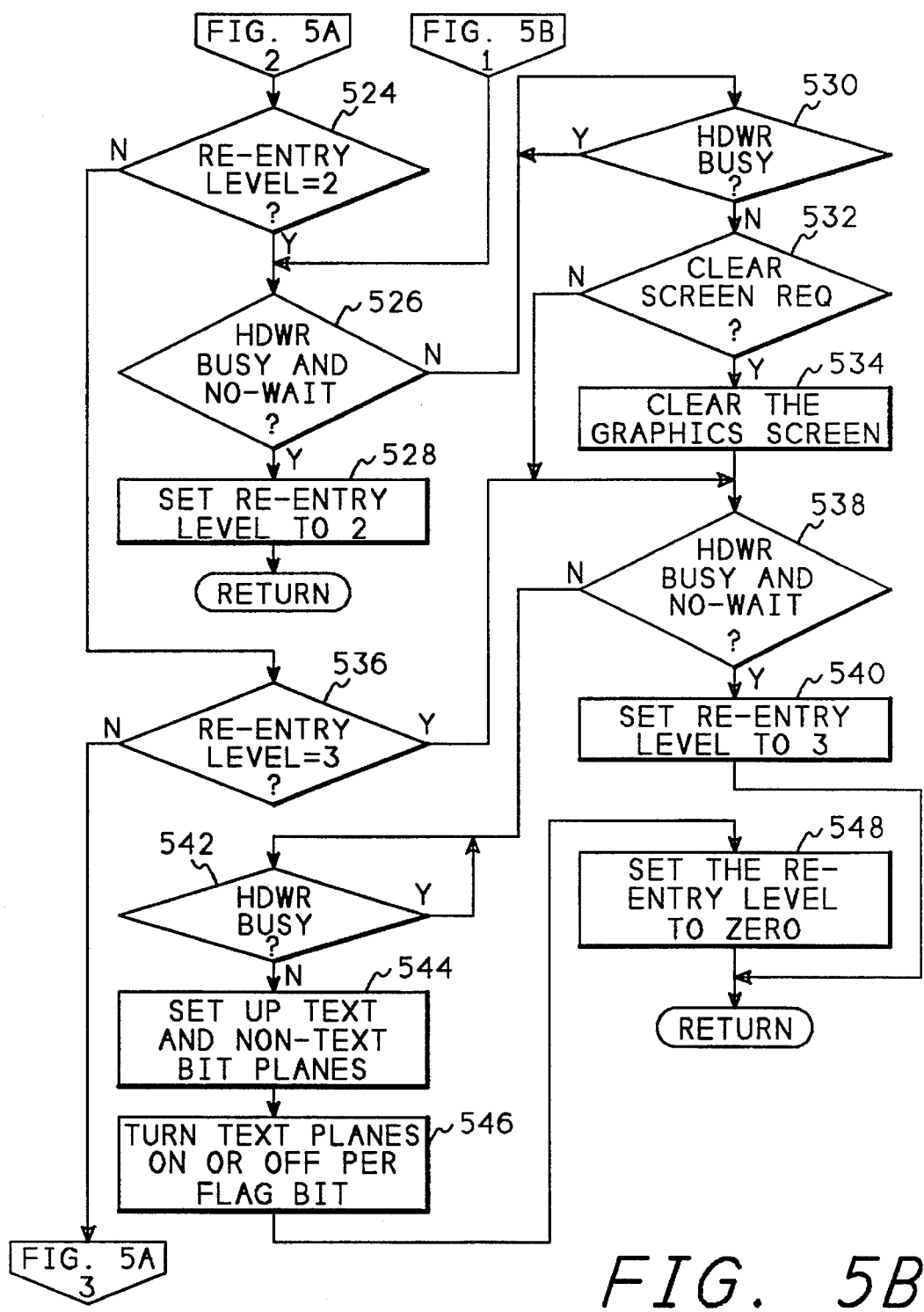

FIGS. 5A and 5B show a flowchart of the INIT_GRAPH routine called from FIG. 3. Referring now to FIGS. 5A and 5B, after entry, block 502 determines whether a frame buffer pointer is available. As discussed above, the frame buffer pointer is one of the addresses contained in the device region list initially pointed to by offset location 0x0063 through 0x006f in the ROM 114. If no frame buffer is available, the device cannot be initialized so block 502 transfers to block 524 which sets an error code and returns to its caller.

If a frame buffer is available, block 502 transfers to block 504 which determines if the re-entry level is greater than zero. If the re-entry level is greater than zero, the INTI_GRAPH routine was previously called and partially completed. If the re-entry level is zero, INIT_GRAPH has not been called or it has completed any previous calls so block 504 goes to block 512 to set up device control registers 126 (FIG. 1) within the graphics device. Block 514 then determines whether the caller requested that the device be reset and if so, block 514 transfers to block 516 which initiates a reset of the device. This is typically done by causing a reset hardware line to be toggled, however, it may be done in software in some devices. Block 518 then determines whether the reset was successful and if not, transfers to block 524 to return an error code. If the reset was successful, or if no reset was requested, control goes to block 508.

If the re-entry level was greater than zero, block 504 transfers to block 506 which determines if the re-entry level is 1. If the re-entry level is 1, block 506 transfers to block 508.

When block 508 receives control, either from block 506, block 514, or block 518, it determines whether the hardware is busy and also whether a no-wait flag was set by the caller. If the hardware is busy and no-wait is set, block 508 goes to block 510 which sets the re-entry level to 1 and returns.

If the hardware is not busy, or if the no-wait flag is not set, block 508 goes to block 520 which waits for the hardware to free, if it was busy, and then block 522 sets up the global configuration structure needed for accessing all the other routines. The global configuration structure contains such information as the number of text planes available in the device, the screen width and number of pixels, and the screen height and number of pixels. Also, this structure contains the number of pixels that are located off the display area in frame buffer memory that is unused. As described above, this area is often used to store font characters in an unpacked format. Also as described above, the global configuration structure will contain a future pointer so that it can be expanded for future devices. After setting up the global configuration structure, block 522 transfers to block 526 on FIG. 5B.

If the re-entry level is not 1, block 506 transfers to block 524 which determines if the re-entry level is equal to 2. If the re-entry level is equal to 2, block 524 goes to block 526.

When block 526 receives control, either from block 522 or block 524, it determines whether the hardware is busy and whether the no-wait flag is set. If the hardware is busy and the no-wait flag is set, block 526 goes to block 528 which sets the re-entry level to 2 and then returns.

If the hardware is not busy, or the no-wait flag is not set, control goes to block 530 which waits until the hardware is free, if it was busy. Control then goes to block 532 which determines whether the caller requested that the screen be cleared. If the caller did request a screen clear, block 532 transfers to block 534 which writes the background color into all pixels of the display area to clear the display. If no clear was requested, or after clearing the screen, control goes to block 538.

If block 524 determines that the re-entry level is not equal to 2, it transfers to block 536 which determines whether the re-entry level is equal to 3. If the re-entry level is not equal to 3, an error has occurred, so block 536 transfers to block 524 on FIG. 5A to return an error code. If the re-entry level is equal to 3, block 536 goes to block 538.

When block 538 receives control, either from block 532, block 534, or block 536, it determines whether the hardware is busy and the no-wait flag was set. If the hardware is busy, and the no-wait flag is set, block 538 goes to block 540 which sets the re-entry level to 3 and then returns.

If the hardware is not busy, or the no-wait flag is not set, block 538 transfers to block 542 which waits for the hardware to free, if it was busy. Block 544 then sets up the text and non-text bit planes of the device and block 546 turns on the text planes to allow display of textual information if a flag was set indicating that the planes should be turned on. Block 548 then sets the re-entry level to zero, to indicate that the INIT_GRAPH routine has completed successfully, and control returns to the caller.

By setting a re-entry level, INIT_GRAPH can return whenever the hardware is busy and be re-entered later to complete the initialization. When re-entered, INIT_GRAPH starts where it had stopped on the previous call.

Figure 6:
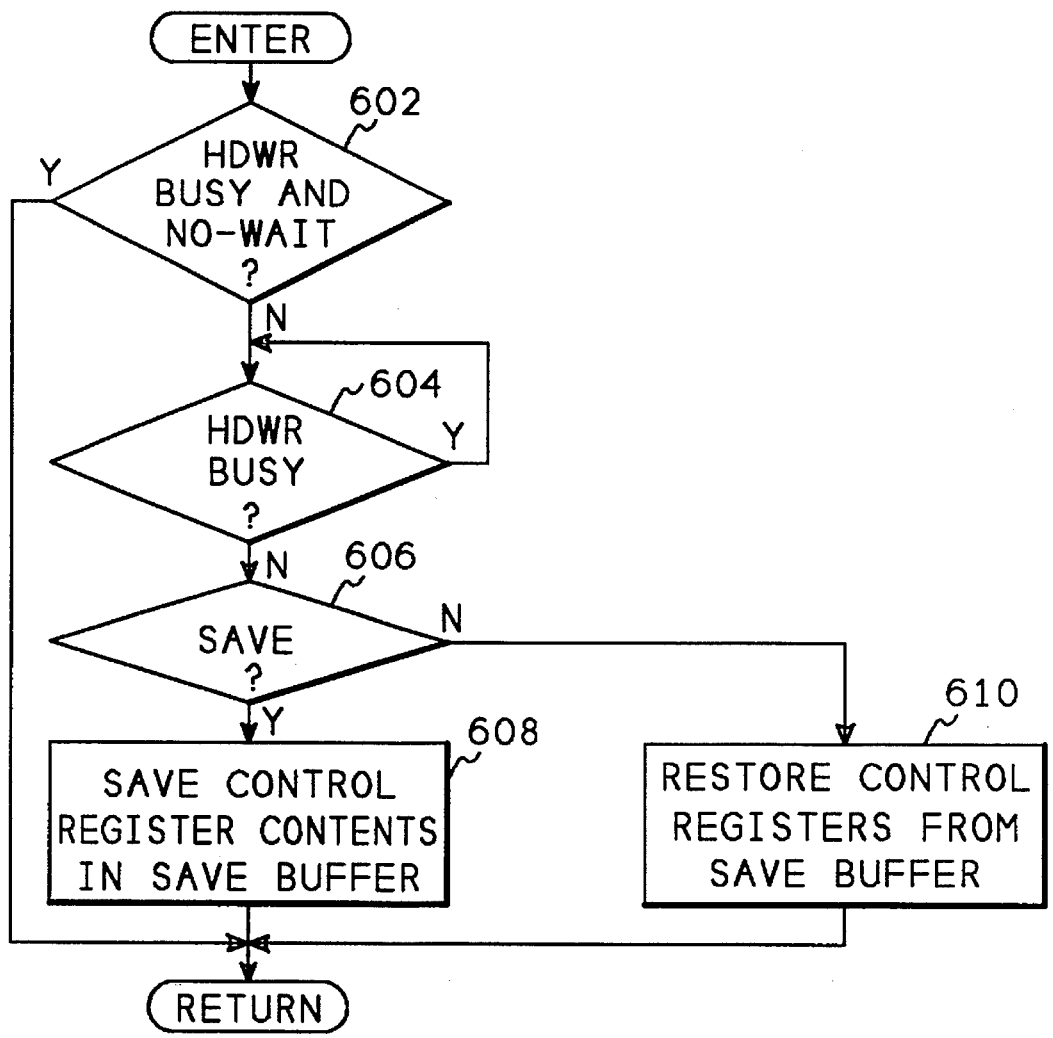
FIG. 6 shows a flowchart of the state management routine.

FIG. 6 shows a flowchart of the state management routine of the device. This routine is called to save or restore the state of the graphics device, so that the contents of the device can be temporarily changed and then restored at a later time. Referring now to FIG. 6, after entry, block 602 determines whether the hardware is busy and the no-wait flag was set by the caller. If the hardware is busy, and the caller indicated that this routine should not wait, block 602 simply returns to the caller. If the caller indicated that this routine should wait, block 602 transfers to block 604 which determines whether the hardware is busy. If the hardware is busy, block 604 simply loops on itself until the hardware is free. Once the hardware is free, control goes to block 606 which determines whether the request was for a save or a restore. If the request is for a save, block 606 transfers to block 608 which saves all the control register 126 contents in a save buffer that was identified by the caller of the routine. As described above with respect to Table 1, the length of the save buffer is defined at offset locations 0x0043 through 0x004f in Table 1. After saving the contents of the control registers, block 608 returns to the caller. If the call is for restoring the contents of the control registers, block 606 transfers to block 610 which copies the register contents from the save buffer back into the registers and then returns to the caller.

Figure 7:
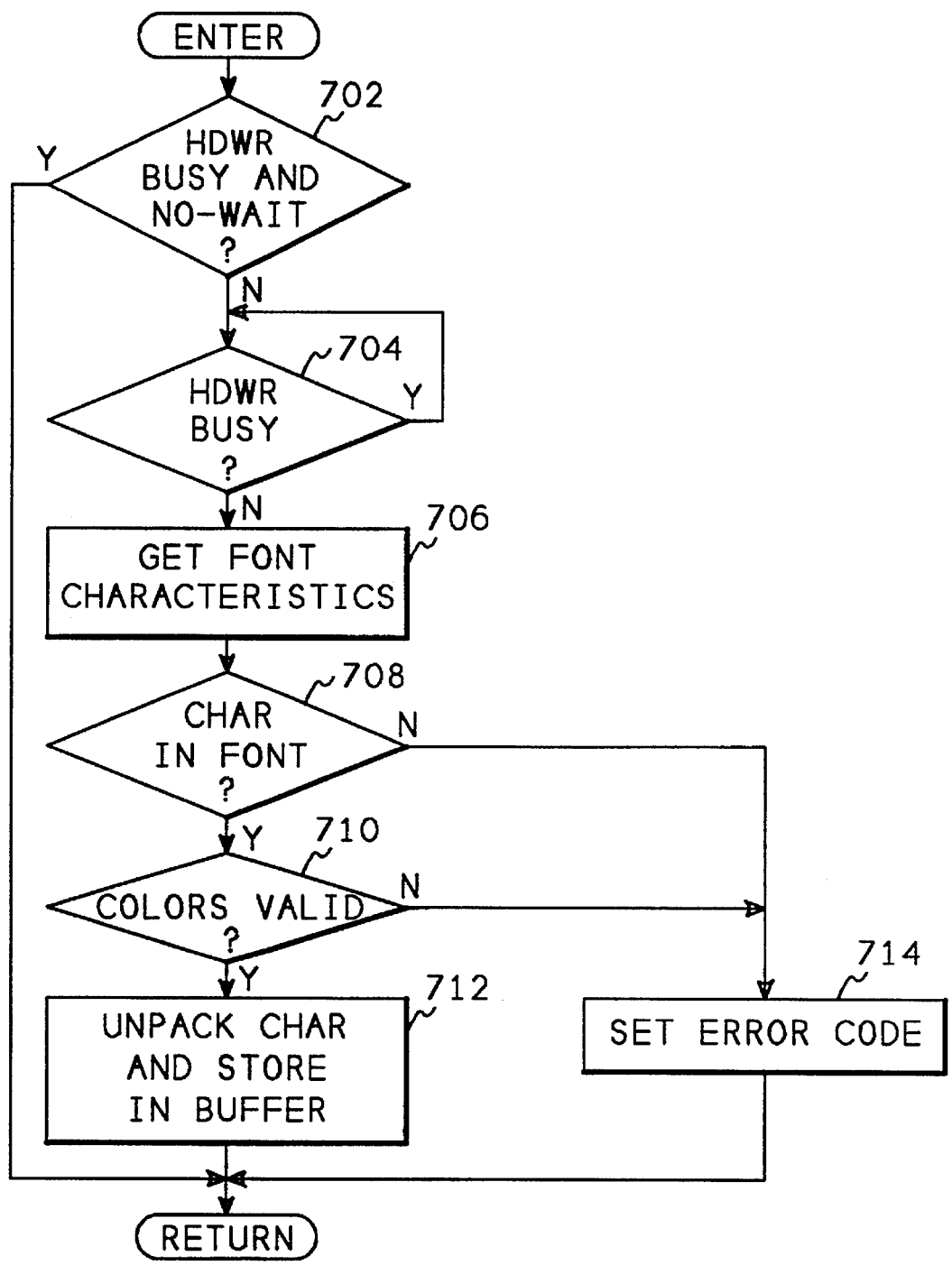
FIG. 7 shows a flowchart of the font unpack and move routine.

FIG. 7 shows a flowchart of the font unpack and move routine of the invention, and Table 2 shows a format of the font storage area used in the ROM 114. For fonts stored in the ROM 114, only eight bits out of every 32 bit word is used. Relative addresses 0x03 and 0x07 contain the ASCII code for the first character in the font and relative addresses 0x0b and 0x0f contain the ASCII code for the last character in the font. Relative location 0x13 contains the width of the font in pixels and relative location 0x17 contains the height of the font in pixels. Relative location 0x1b contains the font type and relative location 0x1f contains the number of bytes of storage used to store each character of the font. Relative locations 0x23 through 0x2f contain a pointer to a next font which may also be contained in the ROM 114. If no additional fonts are stored, this offset is set to zero. Relative locations 0x33 and 0x37 define the height and offset of an underline, so that the operating system can add an underline if it chooses. The pixels for the font are stored starting at relative location 0x43.

The font contained in the ROM 114, and any other font desired to be used by the routine of FIG. 7, are stored in a format wherein the first row of pixels for a character is stored in as many bytes as needed, followed by the second row, etc. If only a partial byte is needed to complete a row of pixels, then the pixels must be left justified within the byte, and the other bits of the byte are unused. For example, a font that is ten pixels wide would use two bytes for the first row. The first byte would have valid pixels in all eight bits, while the second byte would only have valid pixels in the two left most bits. In addition, the inter character spaces are also included in the font. The inter character spaces are incorporated into the font such that they appear along the right and bottom edge of each character. Blank spaces are also provided above and below those characters which are not full height or which lack descenders.

Referring now to FIG. 7, after entry, block 702 determines whether the hardware is busy and the no-wait option has been specified. If the user indicated that the routine should not wait for the hardware, and the hardware is busy, block 702 simply returns to the caller. If the caller indicated that this routine should wait, or if the hardware is not busy, block 702 transfers to block 704 which waits until the hardware is free, if it was busy. After the hardware is free, block 706 gets the font characteristics as defined above with respect to Table 2. Block 708 then determines whether the character that the caller of this routine requested is available in the font, that is, if the character code is greater than or equal to the first character in the font, or if the code is less than or equal to the last character in the font. If the character is not available, block 708 transfers to block 714 which sets an error code and returns to the caller. If the character is available, block 708 transfers to block 710 which determines whether the colors requested by the caller are valid and if not, block 710 also transfers to block 714 to return an error code.

If the colors requested for the character are valid, block 710 transfers to block 712 which unpacks the character and stores it in a displayable format in the frame buffer and then returns to the caller.

Figure 8:
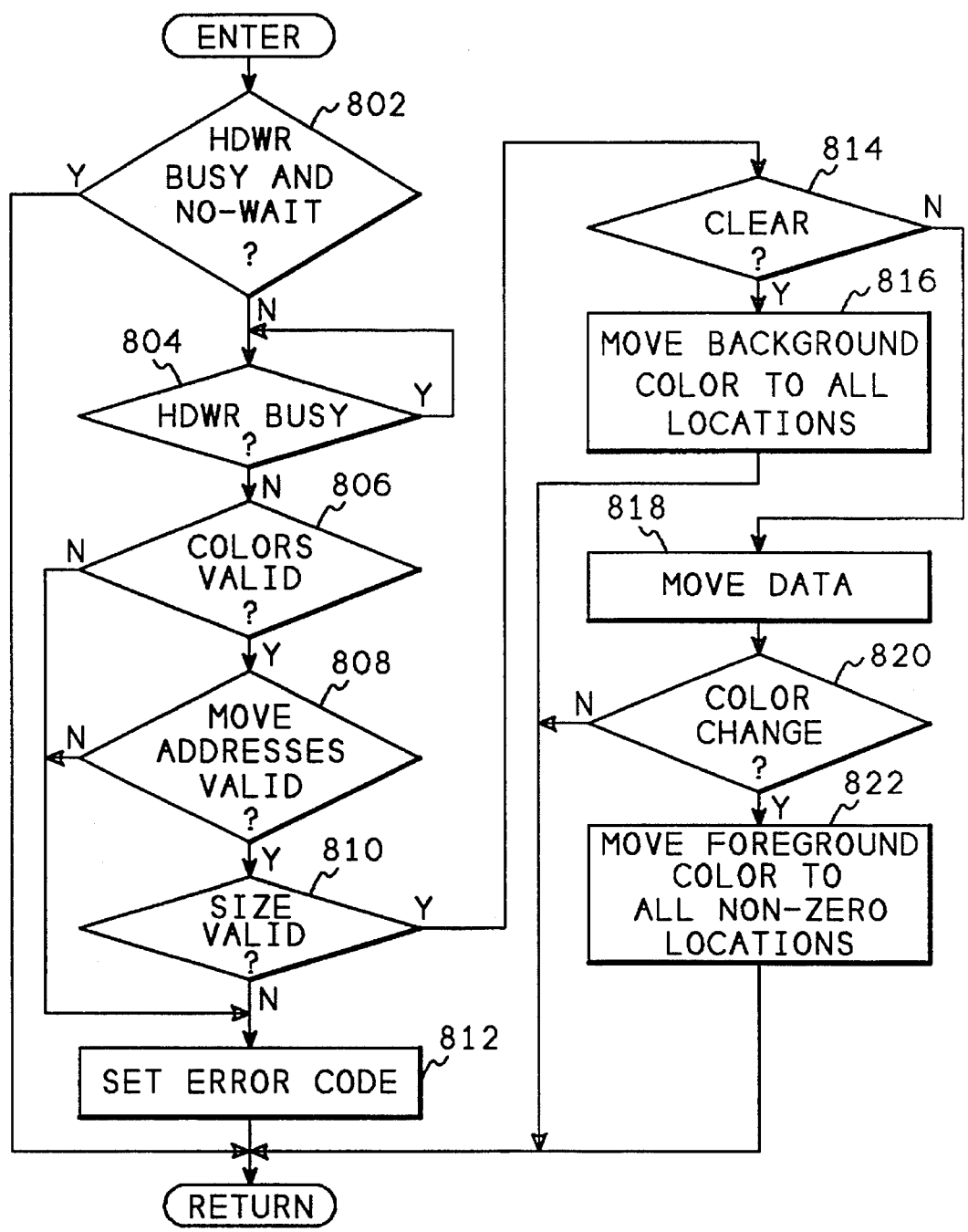
FIG. 8 shows a flowchart of the block move routine.

FIG. 8 shows a flowchart of the block move routine of the present invention. This routine is used to move data from one location on the graphics screen to another location. It can also be used to clear a particular area of the screen or to move information from areas of the frame buffer 124 that are not displayed into areas of the frame buffer 124 that are displayed on the graphic screen. Referring now to FIG. 8, after entry, block 802 determines whether the hardware is busy and the no-wait option was specified. If the hardware is busy and no-wait was specified, block 802 returns to the caller. If not, block 802 transfers to block 804 which waits until the hardware is free and then transfers to block 806. In addition to moving data, this routine can also change the colors of the data being moved. Therefore, block 806 determines whether the colors requested are valid and if not, transfers to block 812 which sets an error code and returns to the caller. If the colors are valid, control transfers to block 808 which determines whether the move addresses are all valid and if not, block 808 also transfers to block 812 to set an error code and return to the caller. If the moved addresses are valid, block 808 transfers to block 810 which determines whether the size of the block being moved is valid. If the size is not valid, block 810 also transfers to block 812 to return an error code.

If the colors, addresses, and size are all valid, control goes to block 814 which determines whether the re-set was to clear the area specified. If the request was for a clear, block 814 transfers to block 816 which moves the background color to all locations in the area specified and then returns to the caller.

If the request is for a move, block 814 transfers to block 818 which moves the data and then block 820 determines whether a color change was requested. If a color change was not requested, block 820 simply returns to the caller. If a color change was requested, block 820 transfers to block 822 which moves the foreground color to all non-zero locations in the target area.

This color change capability allows a font to be unpacked and stored into non-displayable areas of the frame buffer, and then moved by the block move routine of FIG. 8 from these non-displayable areas into the displayable areas while changing the color of the text during the move.

Figure 9:
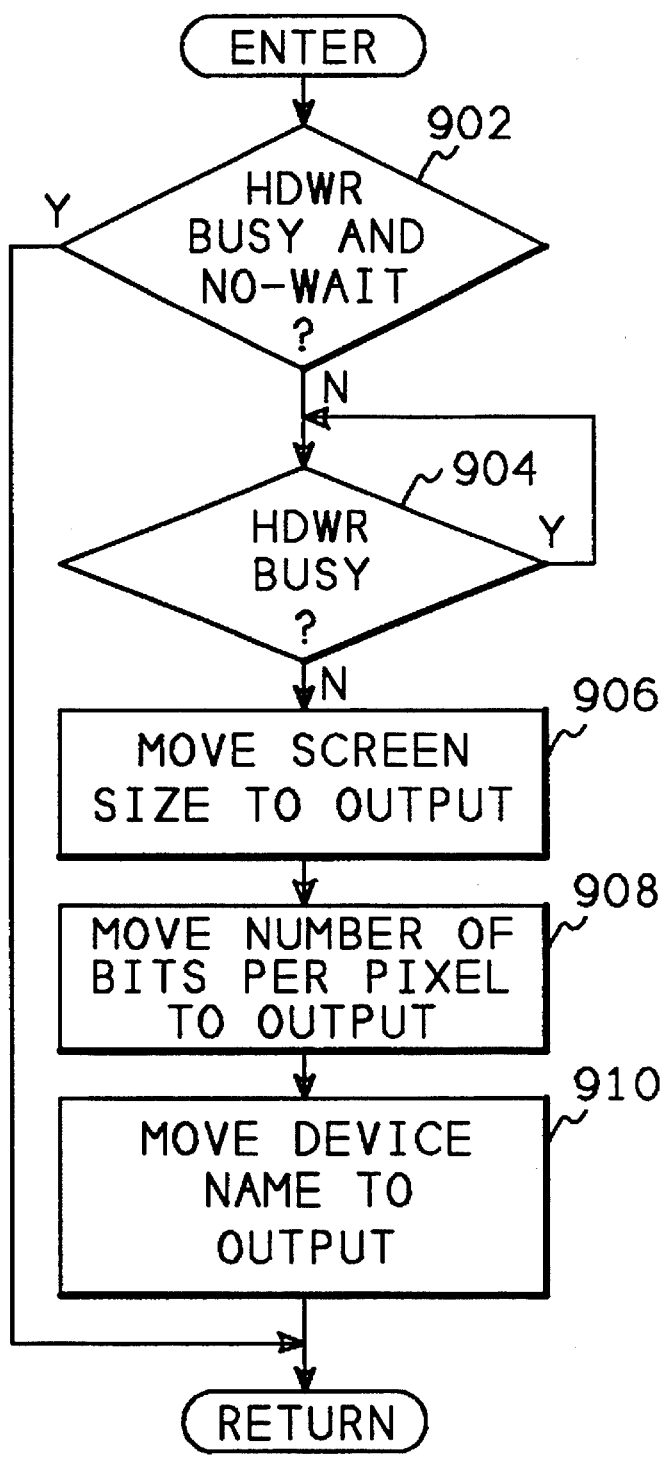
FIG. 9 shows a flowchart of the inquire configuration routine of the invention.

FIG. 9 shows a flowchart of the inquire configuration routine of the invention. Referring now to FIG. 9, after entry, block 902 determines whether the hardware is busy and the no-wait option was specified. If the no-wait option was specified and the hardware is busy, block 902 simply returns to the caller. If not, block 902 transfers to block 904 which waits until the hardware is free and then transfers to block 906. Block 906 then moves the screen size to the output area, block 908 moves the number of bits per pixel to the output area, and block 910 moves the device name to the output area before returning to the caller.

Figure 10:
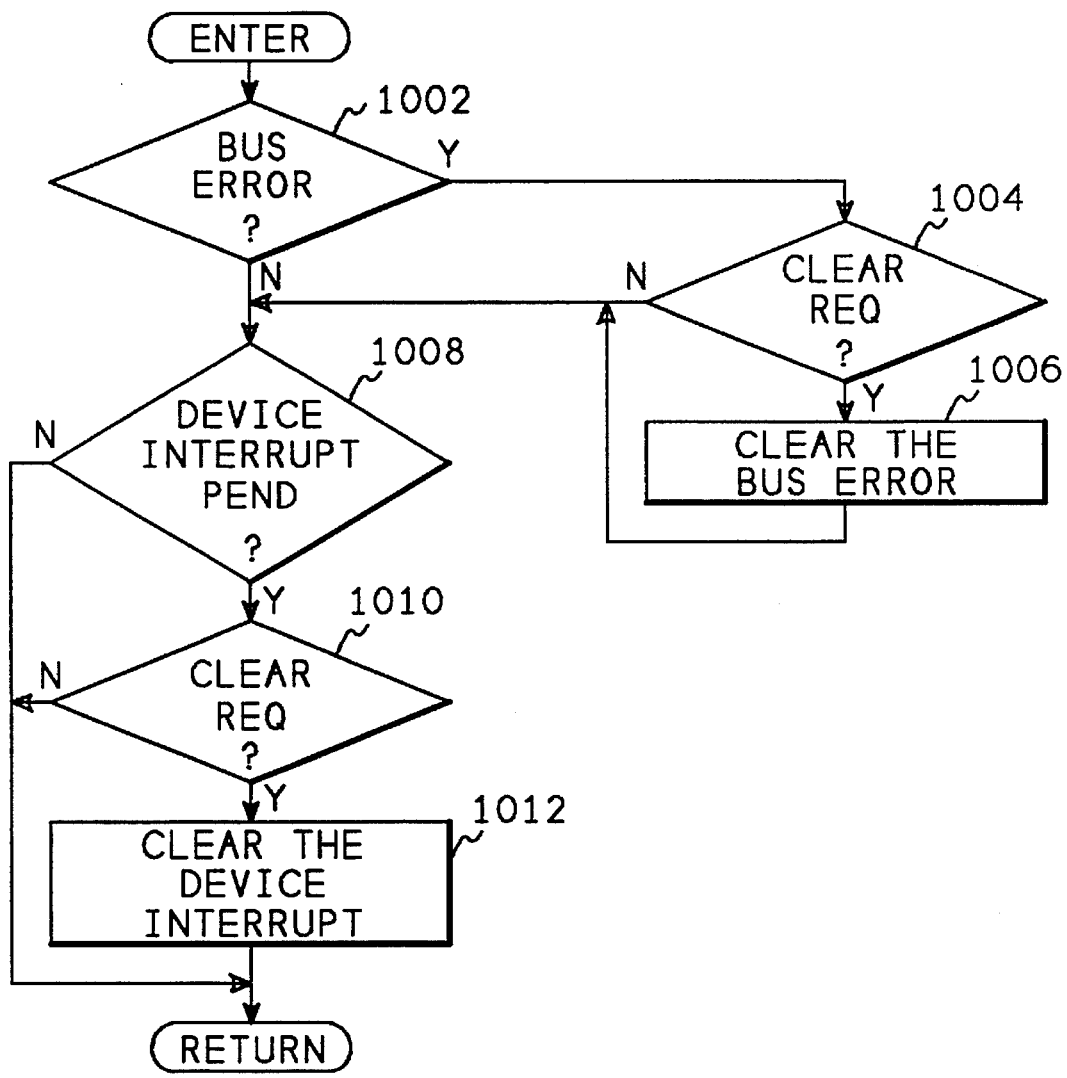
FIG. 10 shows a flowchart of the exception handler interrupt processing routine of the invention.

FIG. 10 shows a flowchart of the exception handler routine of the invention. This routine accepts all interrupts for the device and for bus errors that occur while accessing the device. Referring now to FIG. 10, after entry, block 1002 determines if a bus error is pending. If a bus error is pending, block 1002 transfers to block 1004 which determines if a flag bit was set indicating that bus errors should be cleared. If such a flag bit was set, block 1004 goes to block 1006 which clears the bus error. If no bit was set, or after clearing the bus error, or if no bus error was pending, control goes to block 1008 which determines whether a device interrupt is pending. If no device interrupt is pending, block 1008 returns to the caller. If a device interrupt is pending, block 1008 goes to block 1010 which determines whether a flag bit was set indicating that device interrupts should be cleared. If such a flag bit was set, block 1010 goes to block 1012 which clears the device interrupt. After clearing the device interrupt, or if the clear flag was not set, control returns to the caller. Other interrupt functions could be performed in the routine of FIG. 10, if desired.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Offset | Field Name | Bytes | Example Value |
| --- | --- | --- | --- |
| 0x0003 | Device Type | 1 | |
| 0x0007 | Unused | 1 | |
| 0x000b | Global ROM rev | 1 | STI spec-dependent |
| 0x000f | Local ROM rev | 1 | Device-dependent |
| 0x0013 thru | Graphics ID (MSB) | 8 | (Device-dependent) |
| 0x002f | Graphics ID (LSB) | — | |
| 0x0033 thru | Font Start addr (MSB) | 4 | (Start of Font Table.) |
| 0x003f | Font Start addr (LSB) | — | |
| 0x0043 | Max State Storage (MSB) | 4 | These 4 bytes contain |
| 0x0047 | Max State Storage | — | the maximum number of |
| 0x004b | Max State Storage | — | words needed to save |
| 0x004f | Max State Storage (LSB) | — | the state of the graphics device. |

TABLE 1-continued

| Offset | Field Name | Bytes | Example Value |
|---|---|---|---|
| 0x0053 | Last addr of ROM (MSB) | 4 | The last 2 addrls of |
| 0x0057 | Last addr of ROM | — | the ROM also contain |
| 0x005b | Last addr of ROM | — | the values needed to |
| 0x005f | Last addr of ROM (LSB) | — | make the CRC results be zero. |
| 0x0063 | Dev region List (MSB) | 4 | This value points to |
| 0x0067 | Dev region List | — | the table which |
| 0x006b | Dev region List | — | contains the information needed to map |
| 0x006f | Dev region-List (LSB) | — | this device in memory. |
| 0x0073 | Max Reent Storage (MSB) | 2 | Number of words needed |
| 0x0077 | Max Reent Storage (LSB) | — | for storage if no busy waiting. |
| 0x007b | Max Timeout (MSB) | 2 | Max number of |
| 0x007f | Max Timeout (LSB) | — | tenths of seconds a routine may take. |
| 0x0083 thru | future use | 1 | |
| 0x00ff | future use | 1 | |
| 0x0103 | INIT_GRAPH addr (MSB) | 4 | (PA-RISC addr) |
| 0x0107 | INIT_GRAPH addr | — | |
| 0x010b | INIT_GRAPH addr | — | |
| 0x010f | INIT_GRAPH addr (LSB) | — | |
| 0x0113 thru | STATE_MGMT addr (MSB) | 4 | (PA-RISC addr) |
| 0x011f | STATE_MGMT addr (LSB) | — | |
| 0x0123 thru | FONT_UNP/MV addr (MSB) | 4 | (PA-RISC addr) |
| 0x012f | FONT_UNP/MV addr (LSB) | — | |
| 0x0133 thru | BLOCK_MOVE addr (MSB) | 4 | (PA-RISC addr) |
| 0x013f | BLOCK_MOVE addr (LSB) | — | |
| 0x0143 thru | SELF_TEST addr (MSB) | 4 | (PA-RISC addr) |
| 0x014f | SELF_TEST addr (LSB) | — | |
| 0x0153 thru | EXCEP_HDLR addr (MSB) | 4 | (PA-RISC addr) |
| 0x015f | EXCEP_HDLR addr (LSB) | — | |
| 0x0163 thru | INQ_CONF addr (MSB) | 4 | (PA-RISC addr) |
| 0x016f | INQ_CONF addr (LSB) | — | |
| 0x0173 thru | End addr (MSB) | 4 | (PA-RISC addr) |
| 0x017f | End addr (LSB) | — | |
| 0x0183 thru | future use | 1 | |
| 0x01ff | future use | 1 | |
| 0x0203 | INIT_GRAPH addr (MSB) | 4 | (68000 addr.) |
| 0x0207 | INIT_GRAPH addr (LSB) | — | |
| 0x020b | INIT_GRAPH addr (LSB) | — | |
| 0x020f | INIT_GRAPH addr (LSB) | — | |
| 0x0213 thru | STATE_MGMT addr (MSB) | 4 | (68000 addr.) |
| 0x021f | STATE_MGMT addr (LSB) | — | |
| 0x0223 thru | FONT_UNP/MV addr (MSB) | 4 | (68000 addr.) |
| 0x022f | FONT_UNP/MV addr (LSB) | — | |
| 0x0233 thru | BLOCK_MOVE addr (MSB) | 4 | (68000 addr.) |
| 0x023f | BLOCK_MOVE addr (LSB) | — | |
| 0x0243 thru | SELF_TEST addr (MSB) | 4 | (68000 addr.) |
| 0x024f | SELF_TEST addr (LSB) | — | |
| 0x0253 thru | EXCEP_HDLR addr (MSB) | 4 | (68000 addr.) |
| 0x025f | EXCEP_HDIR addr (LSB) | — | |
| 0x0263 thru | INQ_CONF addr (MSB) | 4 | (68000 addr.) |
| 0x026f | INQ_CONF addr (LSB) | — | |
| 0x0273 thru | End addr (MSB) | 4 | (68000 addr.) |
| 0x027f | End addr (LSB) | — | |
| 0x0283 thru | future use | 1 | |
| 0x02ff | future use | 1 | |

TABLE 2

| Rel Addr | Bytes | Definition |
| --- | --- | --- |
| 0x03 | 2 | ASCII Code for first char in font |
| 0x07 | — | |
| 0x0b | 2 | ASCII Code for last char in font |
| 0x0f | — | |
| 0x13 | 1 | Width of Font in pixels (W) |
| 0x17 | 1 | Height of Font in pixels (H) |
| 0x1b | 1 | Font Type |
| 0x1f | 1 | bytes/char (int((W+7)/8))*H |
| 0x23 | 4 | offset to start of next font |
| 0x27 | — | |
| 0x2b | — | |
| 0x2f | — | |
| 0x33 | 1 | Height of underline in pixels |
| 0x37 | 1 | Offset of underline |
| 0x3b | 1 | Unused |
| 0x3f | 1 | Unused |
| 0x43 | | (int(W+7)/8)*H First character |
| — | | (int(W+7)/8)*H Second character |
| thru | | |
| — | | (int(W+7)/8)*H last character |

What is claimed is:

1. A method for displaying information on each of a plurality of display device types, said method comprising the steps of:

(a) defining a standard programming interface for a set of programmed routines to display said information on said plurality of display device types;

(b) defining a plurality of sets of programmed routines for displaying said information, one of said plurality of sets of programmed routines being defined for each one of said plurality of display device types, and wherein each of said plurality of sets of programmed routines incorporates said standard programming interface, and further defining a plurality of subsets of said sets of programmed routines, one subset for each of a plurality of computer processor types;

(c) storing a selected one of said sets of programmed routines defined for a selected one of said plurality of display device types in a storage device contained within each device of said selected one of said display device types;

(d) installing a selected device of said selected one of said display device types into a computer system;

(e) selecting one of said subsets of said sets of programmed routines to match a computer processor type contained within said computer system; and (f) using said selected one of said subsets of programmed routines to display said information on said selected device.

2. The method of claim 1 wherein step (e) further comprises the step of:

(e1) transferring one of said sets of programmed routines from said storage device on said selected device into a memory of said computer system prior to said using.

3. The method of claim 1 wherein step (a) further comprises the step of:

(a1) defining said standard programming interface to provide an expansion parameter within each data structure passed within said standard programming interface.

4. The method of claim 1 wherein the step (c) further comprises the step of:

(c1) storing said selected one of said sets of programmed routines in a read only memory storage device contained within each device of said selected one of said display device types.

5. The method of claim 4 wherein step (c1) further comprises the step of:

(c1A) storing said selected one of said set of programmed routines in said read only memory device in such a manner that each eight bits of information in said read only memory device is accessible as eight bits of a thirty two bit word addressable within said computer system, and wherein a remaining twenty four bits of said thirty two bit word is unused.

6. The method of claim 1 wherein step (a) further comprises the step of:

(a1) defining said standard programming interface to allow a programmed routine to exit after partial performance, and be re-entered at least a second time to complete performance.

7. A method for displaying information on each of a plurality of display device types, said method comprising the steps of:

(a) defining a standard programming interface for a set of programmed routines to display said information on said plurality of display device types, and further defining said standard programming interface to provide an expansion parameter within each data structure passed within said standard programming interface;

(b) defining a plurality of sets of programmed routines for displaying said information, one of said plurality of sets of programmed routines being defined for each one of said plurality of sets of programmed routines incorporates said standard programming interface;

(c) storing a selected one of said sets of programmed routines defined for a selected one of said plurality of display device types in a storage device contained within each device of said selected one of said display device types;

(d) installing a selected device of said selected one of said display device types into a computer system; and (e) using said selected one of said sets of programmed routines to display said information on said selected device.

8. The method of claim 7 wherein step (e) further comprises the step of:

(e1) transferring one of said sets of programmed routines from said storage device on said selected device into a memory of said computer system prior to said using.

9. The method of claim 7 wherein step (b) further comprises the following step (b1), and wherein step (e) further comprises the following step (e1):

(b1) defining a plurality of subsets of said set of programmed routines, one subset for each of a plurality of computer processor types; and (e1) selecting, within said selected one of said sets of programmed routines, one of said subsets of programmed routines that matches a processor type within said computer system, and using said selected of subset to display said information on said selected device.

10. The method of claim 7 wherein step (c) further comprises the step of:

(c1) storing said selected one of said sets of programmed routines in a read only memory storage device contained within each device of said selected one of said display device types.

11. The method of claim 10 wherein step (c1) further comprises the step of:

(c1A) storing said selected one of said set of programmed routines in said read only memory device in such a manner that each eight bits of information in said read only memory device is accessible as eight bits of a thirty two bit word addressable within said computer system, and wherein a remaining twenty four bits of said thirty two bit word is unused.

12. A system for displaying information on each of a plurality of display device types, said system comprising:

a standard programming interface for a set of programmed routines to display said information on said plurality of display device types, said standard programming interface providing means for an expansion parameter within each data structure passed within said standard programming interface;

a plurality of sets of programmed routines for displaying said information, one of said plurality of sets of programmed routines being defined for each one of said plurality of display device types, and wherein each of said plurality of sets incorporates said standard programming interface, and further comprises plurality of subsets of said routines further comprises plurality of subsets of said sets of programmed routines, one subset for each of a plurality of processor types;

storage means contained within each device of a selected one of said display device types for storing a selected one of said sets of programmed routines defined for said one of said plurality of display device types; and processor means for selecting and using a selected subset of said selected one of said sets of programmed routines, wherein said selected subset matches a processor type of said processor means to display said information on a device of said selected one of said display device types.

13. The system of claim 12 further comprising means for transferring said selected one of said sets of programmed routines from said storage device on a device of said selected one of said display device types into a memory of a computer system prior to said processing means using said selected one of said sets of programmed routines to display said information.

14. The system of claim 12 wherein said storage device comprises a read only memory storage device.

15. The method of claim 14 wherein said read only memory device further comprises means for storing said selected one of said sets of programmed routines in such a manner that each eight bits of information in said read only memory device is accessible as eight bits of a thirty two bit word addressable within a computer system, and wherein a remaining twenty four bits of said thirty two bit word is unused.

* * * * *

UNITED STATES PATENT AND TRADEMARK OFFICE
CERTIFICATE OF CORRECTION

PATENT NO. : 5,481,276
DATED : Jan. 2. 1996
INVENTOR(S) : Conwell J. Dickey, James M. King It is certified that error appears in the above-indentified patent and that said Letters Patent is hereby corrected as shown below:

Col. 16, Claim 7, 1. 29: After "plurality of" insert --display device types, and wherein each of said plurality of--

Col. 17, Claim 12, 1. 18: Before "comprises" insert --wherein each of said sets of programmed routines further--; and after "comprises" insert --a--

Col. 17, Claim 12, 1. 19: After "of said" delete "routines further comprises plurality of subsets of said"

Signed and Sealed this

Third Day of December, 1996

Attest:

BRUCE LEHMAN

*Attesting Officer*     *Commissioner of Patents and Trademarks*